(12) United States Patent
Ryu et al.

(10) Patent No.: US 12,461,558 B2
(45) Date of Patent: Nov. 4, 2025

(54) DISPLAY DEVICE

(71) Applicant: Samsung Display Co., Ltd., Yongin-si (KR)

(72) Inventors: Suchang Ryu, Yongin-si (KR); Hwanjin Kim, Yongin-si (KR); Byeongin Park, Yongin-si (KR); Jin-Hee Bae, Yongin-si (KR); Youngmyung Lee, Yongin-si (KR); Chulho Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 119 days.

(21) Appl. No.: 18/295,686

(22) Filed: Apr. 4, 2023

(65) Prior Publication Data
US 2023/0400880 A1 Dec. 14, 2023

(30) Foreign Application Priority Data
Jun. 14, 2022 (KR) .......................... 10-2022-0072019

(51) Int. Cl.
*G06F 1/16* (2006.01)
*H04M 1/02* (2006.01)

(52) U.S. Cl.
CPC .......... *G06F 1/1618* (2013.01); *G06F 1/1652* (2013.01); *G06F 1/1656* (2013.01); *H04M 1/0214* (2013.01); *H04M 1/0268* (2013.01)

(58) Field of Classification Search
CPC .... G06F 1/1618; G06F 1/1652; G06F 1/1656; G06F 1/1681; H04M 1/0214; H04M 1/0268; G09F 9/301; H10K 77/111; H10K 2102/311
See application file for complete search history.

(56) References Cited

U.S. PATENT DOCUMENTS

| | | | |
|---|---|---|---|
| 9,661,719 B2 | 5/2017 | Jang et al. | |
| 10,553,802 B2* | 2/2020 | Min | H10K 71/00 |
| 10,564,326 B2* | 2/2020 | Namkung | H10K 50/844 |
| 10,586,941 B2 | 3/2020 | Lee et al. | |
| 10,873,043 B2 | 12/2020 | Jin | |
| 11,948,481 B2* | 4/2024 | Lee | H10K 77/111 |
| 11,960,333 B2* | 4/2024 | Wang | G06F 1/1652 |
| 11,989,054 B2* | 5/2024 | Lee | G06F 1/1641 |
| 12,041,738 B2* | 7/2024 | Nguyen | H04M 1/0268 |
| 12,087,187 B2* | 9/2024 | Afsar | G09F 9/301 |
| 12,164,333 B2* | 12/2024 | Wang | G06F 1/1641 |
| 2017/0045914 A1* | 2/2017 | Namkung | H05K 1/028 |

(Continued)

FOREIGN PATENT DOCUMENTS

| | | |
|---|---|---|
| KR | 10-2017-0084402 A | 7/2017 |
| KR | 10-2019-0072237 A | 6/2019 |

(Continued)

*Primary Examiner* — Rockshana D Chowdhury
(74) *Attorney, Agent, or Firm* — Womble Bond Dickinson (US) LLP

(57) ABSTRACT

A display device includes a display panel including a first non-folding region, a folding region, and a second non-folding region, a protective film below the display panel, and an adhesive layer between the display panel and the protective film, and a cutout portion, passing through an entirety of the protective film in a thickness direction and at least a portion of the adhesive layer in the thickness direction, is defined.

19 Claims, 15 Drawing Sheets

(56) References Cited

U.S. PATENT DOCUMENTS

| | | | |
|---|---|---|---|
| 2017/0092884 A1* | 3/2017 | Zhang | H10K 59/879 |
| 2018/0190936 A1* | 7/2018 | Lee | B32B 15/04 |
| 2019/0280248 A1* | 9/2019 | Kwon | G09G 3/3233 |
| 2020/0051881 A1* | 2/2020 | Park | B32B 27/06 |
| 2020/0185641 A1* | 6/2020 | Jeong | H10K 50/84 |
| 2020/0272202 A1* | 8/2020 | Wang | H10D 86/021 |
| 2020/0287169 A1* | 9/2020 | Sung | H10K 77/111 |
| 2020/0401185 A1* | 12/2020 | Won | B32B 38/0004 |
| 2021/0007229 A1* | 1/2021 | Gu | G06F 1/1652 |
| 2021/0118337 A1* | 4/2021 | Park | G09F 9/301 |
| 2021/0174710 A1* | 6/2021 | He | G06F 1/1652 |
| 2022/0189349 A1* | 6/2022 | Roh | G06F 1/1652 |
| 2022/0201879 A1* | 6/2022 | Kwak | H05K 5/0217 |
| 2023/0345652 A1* | 10/2023 | Sakamoto | H01L 29/786 |

FOREIGN PATENT DOCUMENTS

| | | | |
|---|---|---|---|
| KR | 10-2020-0049389 A | 5/2020 | |
| KR | 10-2248677 B1 | 5/2021 | |

* cited by examiner

DISPLAY DEVICE

CROSS-REFERENCE TO RELATED APPLICATION

This application claims priority to and the benefit of Korean Patent Application No. 10-2022-0072019, filed on Jun. 14, 2022 in the Korean Intellectual Property Office, the entire content of which is hereby incorporated by reference.

BACKGROUND

1. Field

Aspects of embodiments of the present disclosure relate to a display device.

2. Description of the Related Art

Display devices provide information to a user by displaying various images on a display screen. In general, display devices display information within a given screen. Recently, flexible display devices including a foldable flexible display panel have been developed. Unlike rigid display devices, flexible display devices may be folded, rolled, or bent. Flexible display devices, which may be variously changed in shape, may be carried regardless of the size of a typical screen, and, thus, user convenience may be improved.

SUMMARY

According to an aspect of embodiments of the present disclosure, a display device having improved folding reliability by reducing the occurrence of a crease in a folding region is provided.

According to an embodiment of the present disclosure, a display device includes: a display panel including a first non-folding region, a folding region, and a second non-folding region; a protective film below the display panel; and an adhesive layer between the display panel and the protective film, wherein a cutout portion, passing through an entirety of the protective film in a thickness direction and at least a portion of the adhesive layer in the thickness direction, is defined.

In an embodiment, the cutout portion defined in the adhesive layer may have a depth of less than half of a thickness of the adhesive layer.

In an embodiment, the cutout portion may overlap with the folding region.

In an embodiment, the first non-folding region, the folding region, and the second non-folding region may be arranged along a first direction, the cutout portion may be provided as a plurality of cutout portions, the plurality of cutout portions may be spaced apart from each other in the first direction, and each of the plurality of cutout portions may extend along a second direction crossing the first direction.

In an embodiment, the plurality of cutout portions may overlap with the folding region.

In an embodiment, the display panel may include a first boundary portion of the first non-folding region adjacent to the folding region and a second boundary portion of the second non-folding region adjacent to the folding region, and the plurality of cutout portions may include a first cutout portion overlapping with the first boundary portion and a second cutout portion overlapping with the second boundary portion.

In an embodiment, a first cutout portion of the plurality of cutout portions overlaps with the first non-folding region, a second cutout portion of the plurality of cutout portions overlaps with the second non-folding region, and a third cutout portion of the plurality of cutout portions overlaps with the folding region.

In an embodiment, the display panel may include a first boundary portion of the first non-folding region adjacent to the folding region and a second boundary portion of the second non-folding region adjacent to the folding region, and the cutout portion may be defined to overlap with one of the first boundary portion or the second boundary portion.

In an embodiment, the first non-folding region, the folding region, and the second non-folding region may be arranged along a first direction, and the cutout portion may include a groove extending along a second direction crossing the first direction.

In an embodiment, the first non-folding region, the folding region, and the second non-folding region may be arranged along a first direction, and the cutout portion may include a plurality of holes arranged to be spaced apart along a second direction crossing the first direction.

In an embodiment, each of the plurality of holes may have a quadrangular shape having a long side parallel to the first direction when viewed in a plan view.

In an embodiment, each of the plurality of holes may have a quadrangular shape having a long side parallel to the second direction when viewed in a plan view.

In an embodiment, each of the plurality of holes may have a quadrangular shape having a long side parallel to a direction between the first direction and the second direction when viewed in a plan view.

In an embodiment, a width of the cutout portion defined in the protective film may become greater as farther away from a boundary between the protective film and the adhesive layer.

In an embodiment, a width of the cutout portion defined in the adhesive layer may become smaller as farther away from a boundary between the protective film and the adhesive layer.

In an embodiment, the cutout portion may have a width of about 30 micrometers or less.

In an embodiment, when the display device is folded, a tensile force applied to the protective film overlapping with the first non-folding region and the second non-folding region may be less than a tensile force applied to the protective film overlapping with the folding region.

In an embodiment, when the display device is viewed in a cross-sectional direction, the cutout portion may have a trapezoidal shape.

According to an embodiment of the present disclosure, a display device includes: a display panel including a first non-folding region, a folding region, and a second non-folding region which are arranged along a first direction; a protective film below the display panel and including a first protective film overlapping with the first non-folding region, a second protective film overlapping with the folding region, and a third protective film overlapping with the second non-folding region; and an adhesive layer between the display panel and the protective film, wherein the first protective film, the second protective film, and the third protective film are spaced apart from each other in the first direction.

In an embodiment, cutout portions passing through at least a portion of the adhesive layer in a thickness direction may be respectively defined between the first protective film and the second protective film and between the second protective film and the third protective film, and the cutout portions defined in the adhesive layer may have a depth of less than half of a thickness of the adhesive layer.

BRIEF DESCRIPTION OF THE DRAWINGS

The accompanying drawings are included to provide a further understanding of the inventive concept, and are incorporated in and constitute a part of this specification. The drawings illustrate some embodiments of the inventive concept and, together with the description, serve to explain principles of the inventive concept. In the drawings.

DETAILED DESCRIPTION

Figure 1:
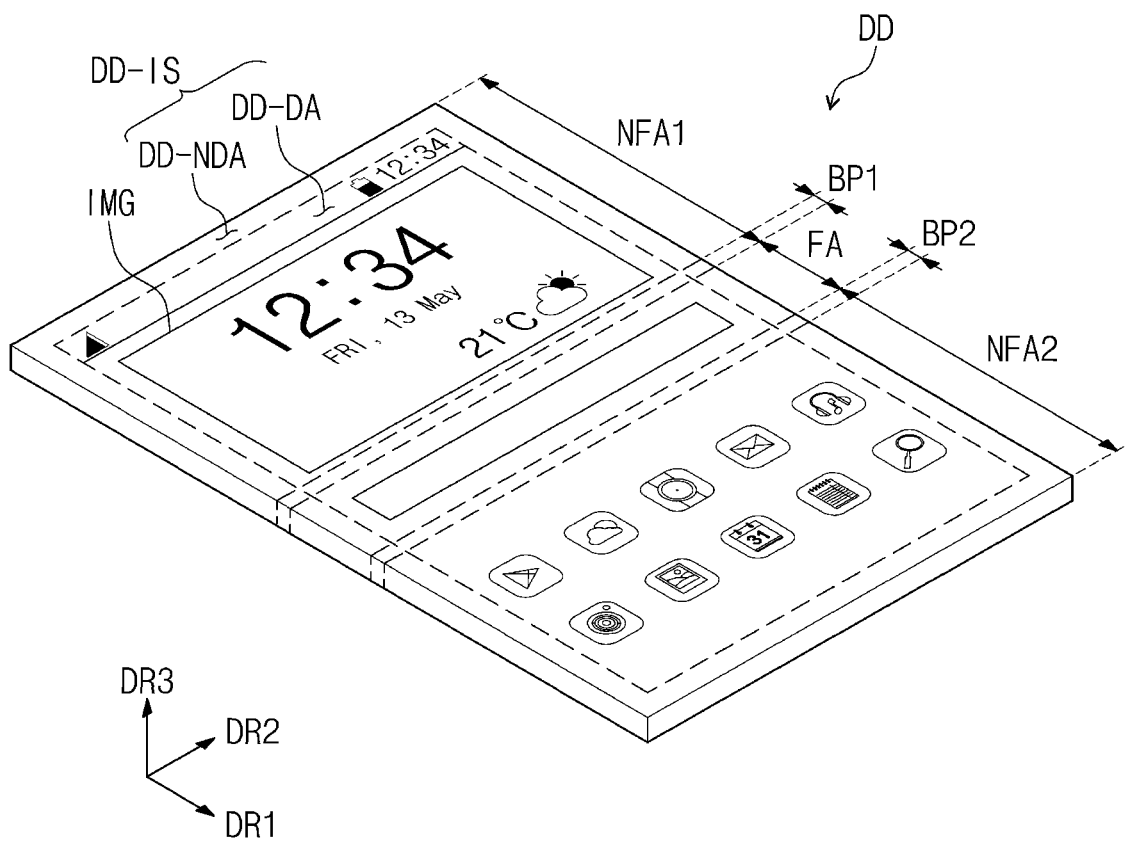
FIG. 1 is a perspective view of a display device according to an embodiment of the inventive concept.

In this specification, when an element (or a region, a layer, a portion, or the like) is referred to as being "on," being "connected to," or being "coupled to" another element, it may be directly disposed/on/connected/coupled to the another element, or one or more intervening third elements may also be disposed therebetween.

Like numbers or symbols refer to like elements throughout. Also, in the drawings, the thicknesses, ratios, and dimensions of the elements may be exaggerated for effective description of the technical contents. "And/or" includes one or more combinations which may be defined by the associated elements.

Although the terms "first," "second," etc. may be used to describe various elements, these elements should not be limited by these terms. These terms are used to distinguish one element from another element. For example, a first element may be referred to as a second element, and, similarly, a second element may also be referred to as a first element without departing from the scope of the present disclosure. The singular forms include the plural forms as well, unless the context clearly indicates otherwise.

Also, terms of "below," "on a lower side," "above," "on an upper side," or the like may be used to describe relationships of the elements illustrated in the drawings. However, these terms have relative concepts and may be described on the basis of the directions indicated in the drawings.

It is to be understood that the term "includes" or "comprises," when used in this specification, specifies the presence of stated features, integers, steps, operations, elements, components, or a combination thereof, but does not preclude the presence or addition of one or more other features, integers, steps, operations, elements, components, or combinations thereof.

The terms "part" and "unit" may refer to a software component or a hardware component that performs a specific function. For example, the hardware component may include a field-programmable gate array (FPGA) or application-specific integrated circuit (ASIC). The software component may refer to data used by an executable code and/or an executable code in an address-storable medium. Thus, the software components may be, for example, object-oriented software components, class components, and task components, and may include processes, functions, attributes, procedures, subroutines, program code segments, drivers, firmwares, microcodes, circuits, data, database, data structures, tables, arrays, or variables.

Unless otherwise defined, all terms (including technical and scientific terms) used herein have the same meaning as commonly understood by one of ordinary skill in the art to which the present disclosure belongs. Also, terms, such as those defined in commonly used dictionaries, should be interpreted as having a meaning that is consistent with their meaning in the context of the relevant art and should not be interpreted in an overly idealized or overly formal sense unless expressly so defined herein.

Herein, some embodiments of the inventive concept will be described with reference to the drawings.

FIG. 1 is a perspective view of a display device DD according to an embodiment of the inventive concept.

Referring to FIG. 1, the display device DD may display an image IMG through a display surface DD-IS. As an example of the image IMG, a clock window image, a search window image, and icon images are illustrated. The display surface DD-IS is parallel to a plane defined by a first direction DR1 and a second direction DR2. A normal direction of the display surface DD-IS, that is, a thickness direction of the display device DD, is indicated as a third direction DR3. A front surface (or a top surface) and a rear surface (or a bottom surface) of each of members or units to be described below may be distinguished based on the third direction DR3.

The display surface DD-IS may include a display region DD-DA on which the image IMG is displayed and a non-display region DD-NDA adjacent to the display region DD-DA. The non-display region DD-NDA is a region on which an image is not displayed. In an embodiment, the display region DD-DA may have a quadrangular shape. In an embodiment, the non-display region DD-NDA may surround the display region DD-DA. However, embodiments of the inventive concept are not limited thereto, and a shape of the display region DD-DA and a shape of the non-display region DD-NDA may be relatively designed. In addition, in an embodiment of the inventive concept, the non-display region DD-NDA may be omitted.

The display device DD may include a plurality of regions defined according to an operation mode. The display device DD may include a first non-folding region NFA1, a second non-folding region NFA2, and a folding region FA that is disposed between the first non-folding region NFA1 and the second non-folding region NFA2. The first non-folding region NFA1, the folding region FA, and the second non-folding region NFA2 may be arranged along the first direction DR1. Also, the display device DD may include a first boundary portion BP1 and a second boundary portion BP2. The first boundary portion BP1 may be a portion of the first non-folding region NFA1 adjacent to the folding region FA.

The second boundary portion BP2 may be a portion of the second non-folding region NFA2 adjacent to the folding region FA.

FIG. 1 illustrates a portable electronic device as an example of the display device DD. However, embodiments of the inventive concept are not limited thereto, and the display device DD may be used in small- and medium-sized electronic devices, such as mobile phones, tablets, vehicle navigation units, game consoles, and smart watches, as well as in large-sized electronic devices, such as televisions and monitors, for example.

Figure 2A:
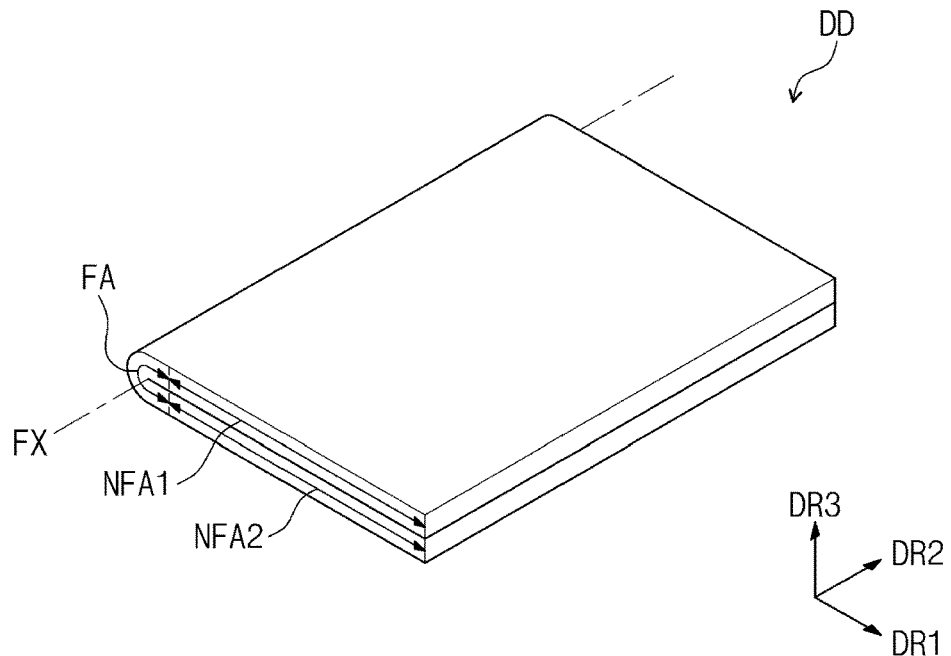
FIG. 2A illustrates a display device according to an embodiment of the inventive concept in an in-folded state.
Figure 2B:
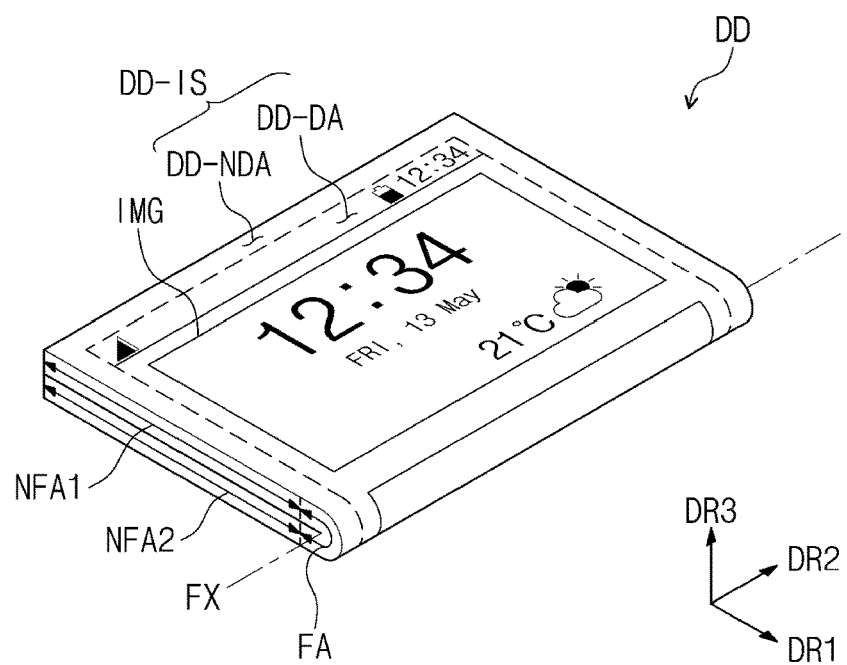
FIG. 2B illustrates a display device according to an embodiment of the inventive concept in an out-folded state.

FIG. 2A illustrates the display device DD according to an embodiment of the inventive concept in an in-folded state. FIG. 2B illustrates the display device DD according to an embodiment of the inventive concept in an out-folded state.

Referring to FIG. 2A, the folding region FA is a region that is folded on the basis of a folding axis FX and substantially forms a curvature. The display device DD may be in-folded such that the display surface DD-IS in the first non-folding region NFA1 and the display surface DD-IS in the second non-folding region NFA2 face each other.

Referring to FIG. 2B, the display device DD may be out-folded such that the display surface DD-IS is exposed to the outside. The folding axis FX may extend along the second direction DR2, and, in an embodiment, the folding axis FX may be parallel to a short-axis direction of the display device DD.

Figure 3:
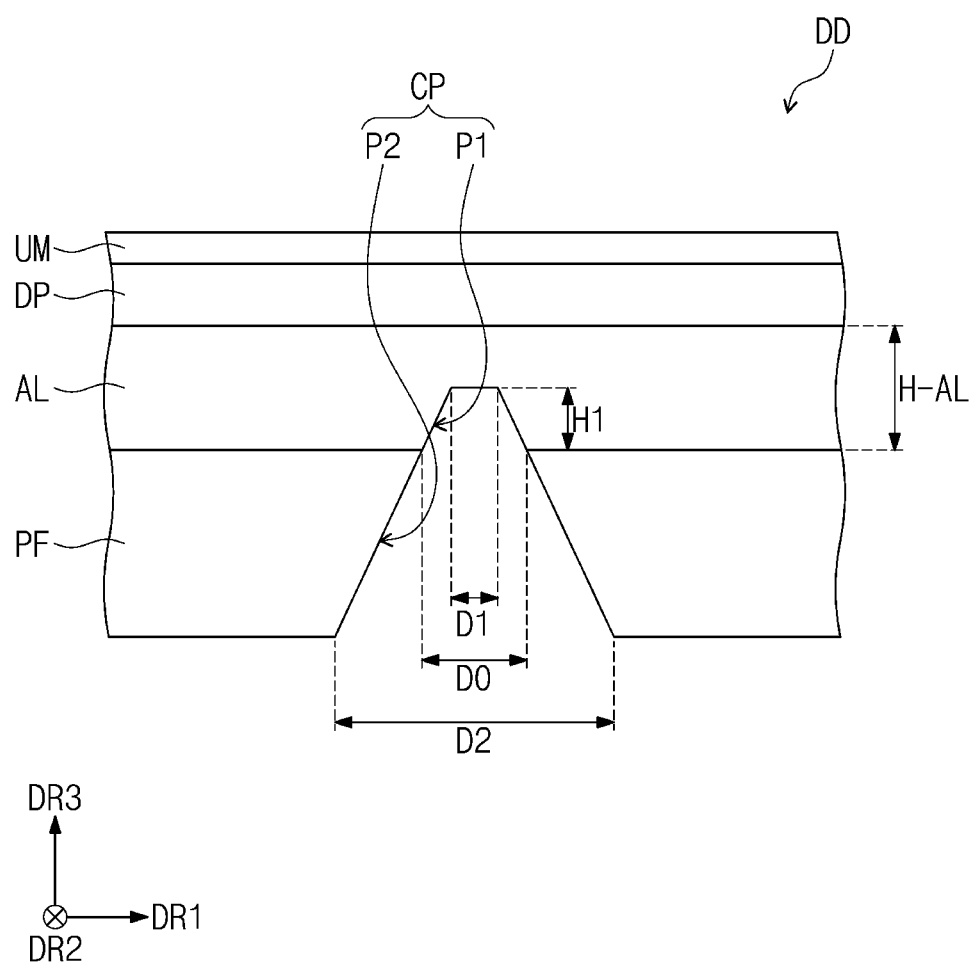
FIG. 3 is a cross-sectional view of a portion of a display device according to an embodiment of the inventive concept.

FIG. 3 is a cross-sectional view of a portion of the display device DD according to an embodiment of the inventive concept.

Referring to FIG. 3, in an embodiment, the display device DD may include a protective film PF, an adhesive layer AL, a display panel DP, and an upper member UM. The display device DD may be a flexible display device, and, thus, each of the protective film PF, the adhesive layer AL, the display panel DP, and the upper member UM may have flexibility. That is, each of the protective film PF, the adhesive layer AL, the display panel DP, and the upper member UM may include a first non-folding region NFA1 (see FIG. 1) and a second non-folding region NFA2 (see FIG. 1), and a folding region FA (see FIG. 1).

The protective film PF may be disposed below the display panel DP. The protective film PF may prevent or substantially prevent scratches from occurring on the rear surface of the display panel DP during a process for manufacturing the display panel DP. In an embodiment, the protective film PF may be a colored polyimide film. For example, the protective film PF may be an opaque yellow film, but the material of the protective film PF is not limited to any one example as long as the material may have flexibility and may protect a lower portion of the display panel DP.

The display panel DP may be disposed above the protective film PF. The display panel DP may be configured to substantially generate an image. The display panel DP may be a light-emitting-type display panel, but is not particularly limited thereto. For example, the display panel DP may be an organic light-emitting display panel, an inorganic light-emitting display panel, or a quantum-dot light-emitting display panel. A light-emitting layer of the organic light-emitting display panel may include an organic light-emitting material, and a light-emitting layer of the inorganic light-emitting display panel may include an inorganic light-emitting material. A light-emitting layer of a quantum-dot light-emitting display panel may include quantum dots, quantum rods, or the like. Herein, the display panel DP is described as the organic light-emitting display panel.

Although not illustrated, the display panel DP may include a base layer, a circuit element layer, a display element layer, and an encapsulation layer.

The adhesive layer AL may be disposed between the protective film PF and the display panel DP and may couple the protective film PF and the display panel DP. The adhesive layer AL may include a transparent adhesive such as an optically clear adhesive film (OCA), an optically clear resin (OCR), or a pressure sensitive adhesive film (PSA). However, the type of an adhesive included in the adhesive layer AL is not limited thereto.

The upper member UM may be disposed on the display panel DP. The upper member UM may be an input sensing layer, an optical layer, or a window.

The input sensing layer may provide the display panel DP with an input signal corresponding to an external input, and the display panel DP may generate an image corresponding to the corresponding input signal. The optical layer may reduce reflectance due to external light incident from an outside of the display device DD. In an embodiment, the window may cover an entire outer side of a display module including the display panel DP, and may protect the display module from external impacts and scratches.

A cutout portion CP may be defined in the display device DD. As the cutout portion CP is formed in the display device DD, a tensile force applied to the protective film PF which overlaps the first non-folding region NFA1 (see FIG. 1) and the second non-folding region NFA2 (see FIG. 1) may be smaller than a tensile force applied to the protective film PF overlapping the folding region FA (see FIG. 1). Accordingly, deformation of the display device DD caused by folding of the display device DD may be reduced or prevented.

The cutout portion CP may include a first cutout section P1 defined in the adhesive layer AL and a second cutout section P2 defined in the protective film PF. The cutout portion CP may pass through an entirety of the protective film PF in a thickness direction and at least a portion of the adhesive layer AL in the thickness direction. That is, the first cutout section P1 may be partially formed along the third direction DR3 of the adhesive layer AL, and the second cutout section P2 may be formed to penetrate an entirety of the protective film PF in the third direction DR3.

The cutout portion CP may be formed through a process of manufacturing the display panel DP or a process of manufacturing a display module (not shown). In an embodiment, the cutout portion CP may be formed by emitting a laser toward the display panel DP or the display module (not shown). Accordingly, in an embodiment, when the display device DD is viewed in the cross-sectional direction, the cutout portion CP may have a trapezoidal shape. However, the cross-sectional shape of the cutout portion CP is not limited thereto, and is not limited to any one example while being formed by emitting a laser.

A minimum width of the first cutout section P1 defined in the adhesive layer AL may be defined as a first width D1, and a maximum width of the second cutout section P2 defined in the protective film PF may be defined as a second width D2. A width of the first cutout section P1 defined in the adhesive layer AL may become smaller as farther (going farther) away from a boundary between the protective film PF and the adhesive layer AL. That is, the first width D1 may be smaller than a width DO of the cutout portion CP at the boundary between the protective film PF and the adhesive layer AL. A width of the second cutout section P2 defined in the protective film PF become greater as farther (going farther) away from the boundary between the protective film PF and the adhesive layer AL. That is, the second width D2 may be greater than the width DO of the cutout portion CP at the boundary between the protective film PF and the adhesive layer AL.

In an embodiment, the second width D2, or a maximum width of the cutout portion CP, may be about 30 micrometers or less. When the width of the cutout portion CP exceeds about 30 micrometers, the cutout portion CP may be viewed from the outside of the display device DD. Accordingly, by forming the width of the cutout portion CP to be about 30 micrometers or less, it is possible to prevent or substantially prevent the cutout portion CP from being viewed from the outside of the display device DD.

A depth H1 of the first cutout section P1 defined in the adhesive layer AL may be defined as a first depth H1. In an embodiment, the first depth H1 may be less than half of a thickness H-AL of the adhesive layer AL. When the first depth H1 is equal to half of the thickness H-AL of the adhesive layer AL or greater than half of the thickness H-AL of the adhesive layer AL, the risk of damage to the display panel DP may increase. Accordingly, as the first depth H1 is less than half of the thickness H-AL of the adhesive layer AL, damage to the display panel DP may be reduced or prevented, and product reliability of the display panel DP may be improved.

Figure 4A:
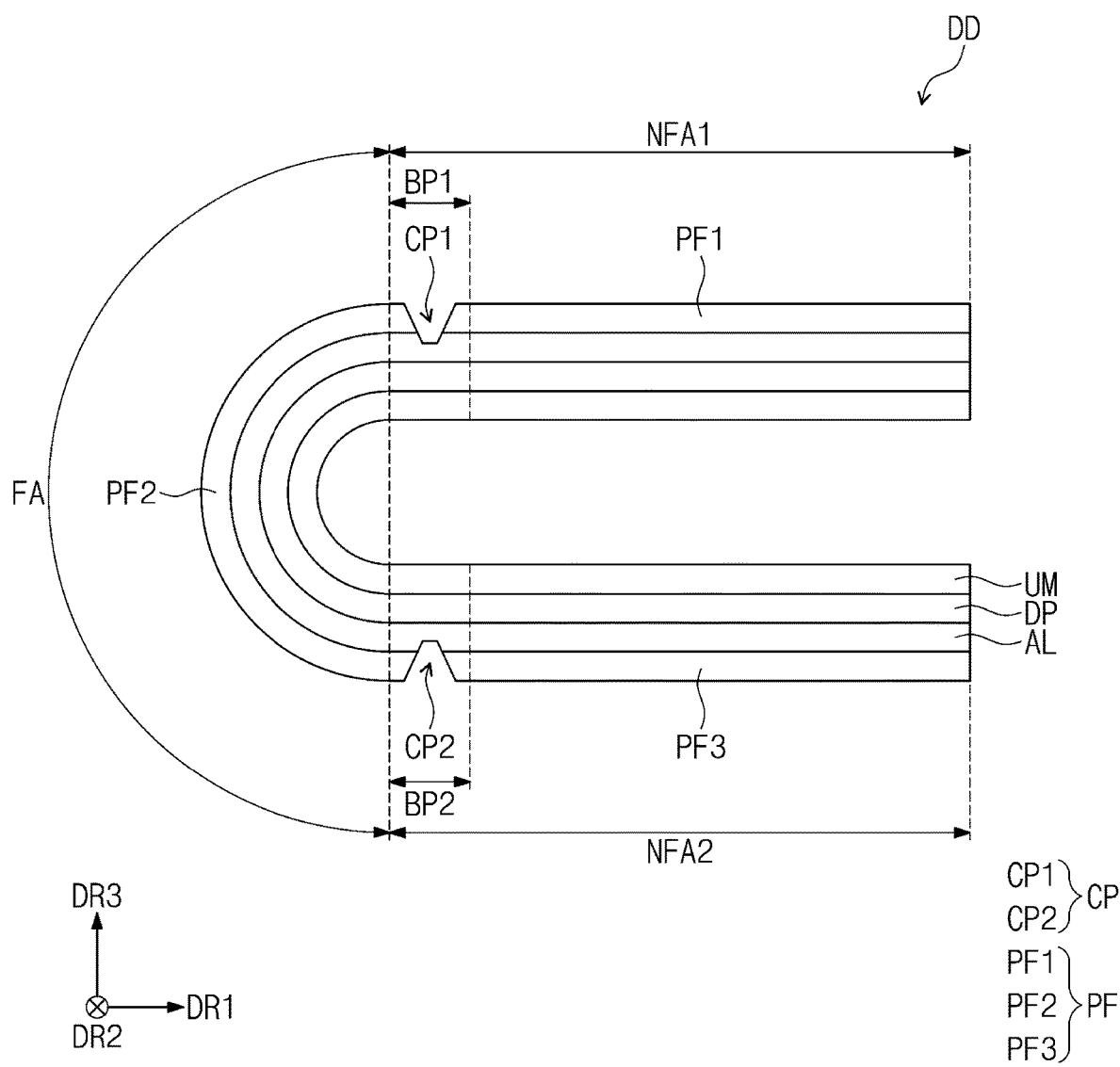
FIGS. 4A and 4B are cross-sectional views of a display device in a folded state according to some embodiments of the inventive concept.
Figure 4B:
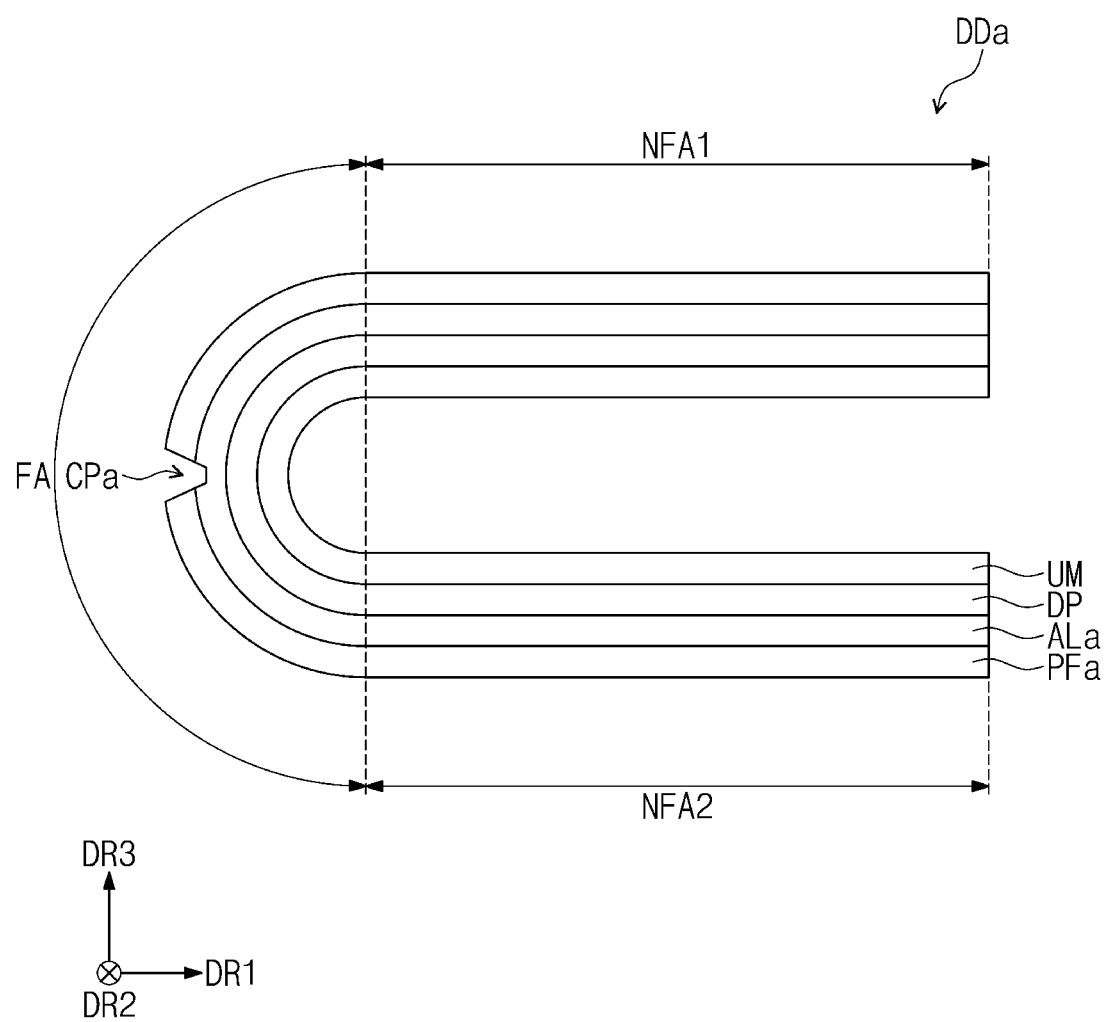

FIGS. 4A and 4B are cross-sectional views of a display device DD or DDa in a folded state according to some embodiments of the inventive concept. FIGS. 5 to 9 are plan views of protective films PF, PFa, PFb, PFc, and PFd of a display device according to some embodiments of the inventive concept.

Figure 5:
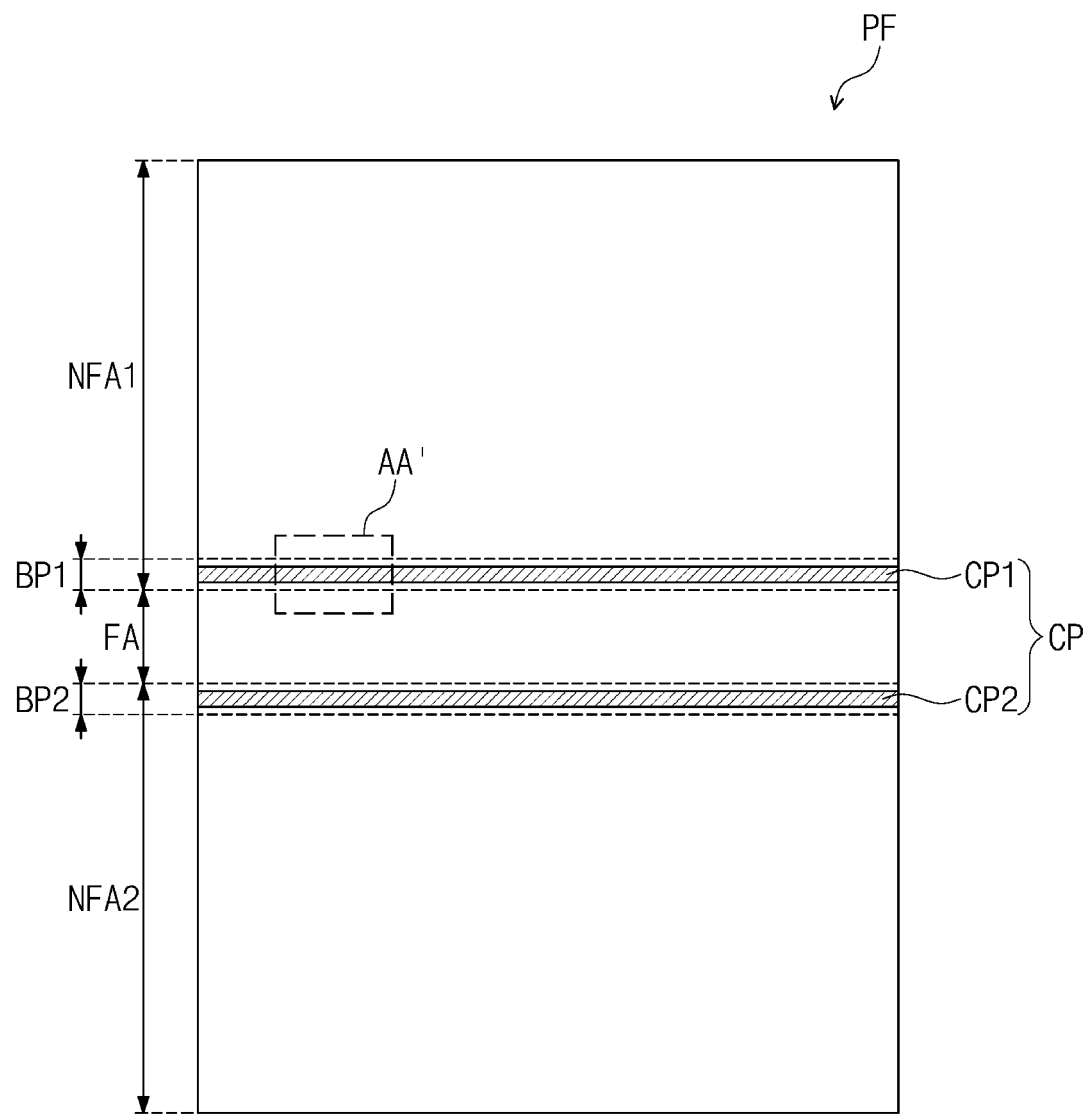
FIGS. 5 to 9 are plan views of protective films of a display device according to some embodiments of the inventive concept.

Referring to FIGS. 4A and 5, the protective film PF may include a first protective film PF1, a second protective film PF2, and a third protective film PF3. The first protective film PF1 may overlap with the first non-folding region NFA1, the second protective film PF2 may overlap with the folding region FA, and the third protective film PF3 may overlap with the second non-folding region NFA2. The first protective film PF1, the second protective film PF2, and the third protective film PF3 may be disposed to be spaced apart from each other in the first direction DR1.

The cutout portion CP may be provided as a plurality of cutout portions CP in the protective film PF and the adhesive layer AL. The plurality of cutout portions CP may extend in a second direction DR2 and may be formed to be spaced apart from each other in the first direction DR1. The plurality of cutout portions CP may include a first cutout portion CP1 and a second cutout portion CP2. The first cutout portion CP1 may overlap with the first boundary portion BP1, and the second cutout portion CP2 may overlap with the second boundary portion BP2. The first cutout portion CP1 may be formed in the first non-folding region NFA1 adjacent to the folding region FA, and the second cutout portion CP2 may be formed in the second non-folding region NFA2 adjacent to the folding region FA. That is, the first cutout portion CP1 may be defined in a space where the first protective film PF1 and the second protective film PF2 are spaced apart, and the second cutout portion CP2 may be defined in a space where the second protective film PF2 and the third protective film PF3 are spaced apart.

Since the first cutout portion CP1 and the second cutout portion CP2 are respectively formed in the first boundary portion BP1 and the second boundary portion BP2, a tensile force generation region wherein tensile force is generated during folding of the display device DD may be limited to the folding region FA, and the tensile force may not be generated in the first non-folding region NFA1 and the second non-folding region NFA2. Since the area of the tensile force generation region is reduced, a maximum amount of deformation due to the tensile force may be reduced, and a folding stress applied to the first non-folding region NFA1 and the second non-folding region NFA2 may be prevented or reduced. In addition, an edge portion, such as a bending portion (not shown) of a chip on plastic (COP) of the display device DD, may not be affected by folding. Accordingly, damage to the display device DD according to the folding and unfolding operations may be reduced or prevented.

Figure 6:
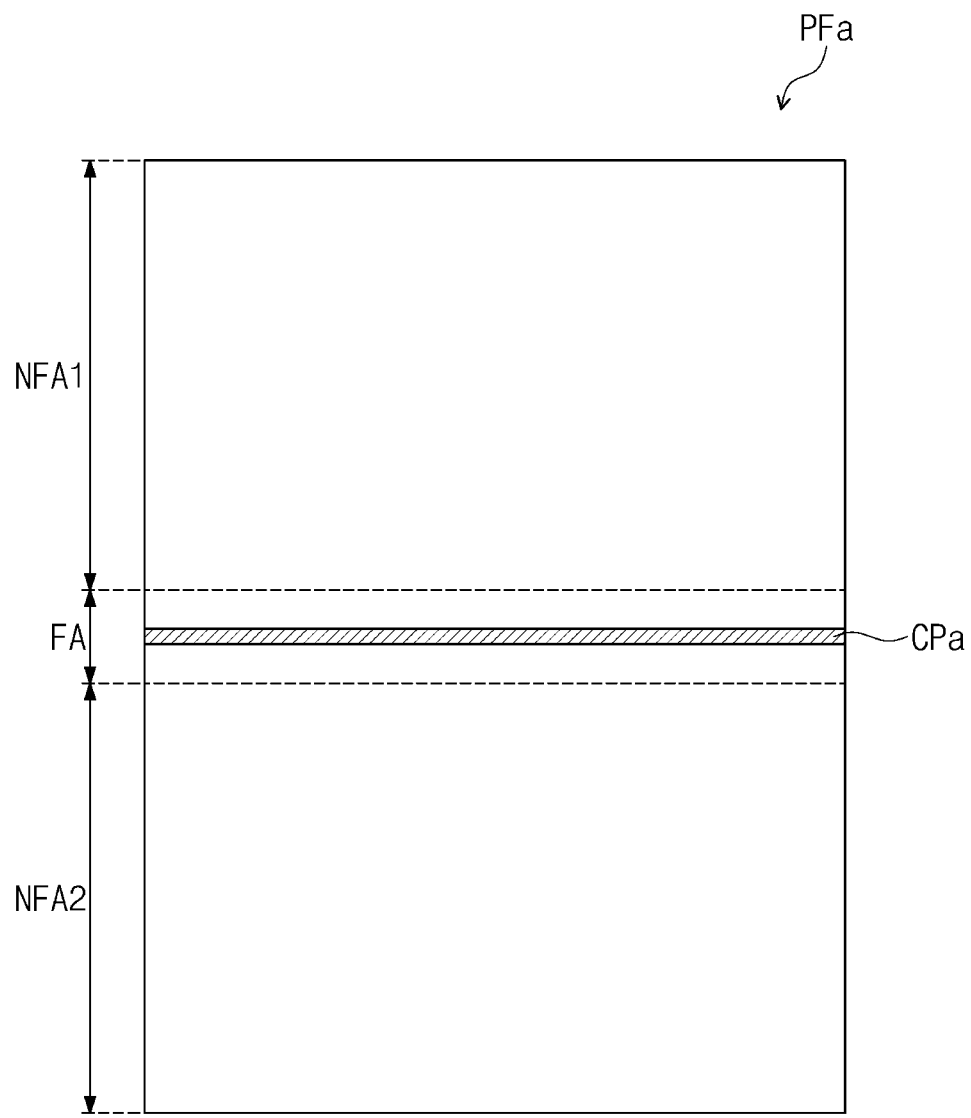

Referring to FIGS. 4B and 6, a cutout portion CPa may overlap a folding region FA of a protective film PFa and an adhesive layer ALa. The cutout portion CPa may extend in the second direction DR2. As the cutout portion CPa is formed in the folding region FA, a tensile force generated when the display device DDa is folded may be reduced. Since the tensile force is reduced, damage to the display device DDa caused by folding and unfolding operations may be reduced or prevented. Although FIG. 6 illustrates an example in which the cutout portion CPa is formed in a center of the folding region FA, the location of the cutout portion CPa is not limited thereto. For example, the cutout portion CPa may be formed in the folding region FA adjacent to the first non-folding region NFA1 or may be formed in the folding region FA adjacent to the second non-folding region NFA2.

Figure 7:
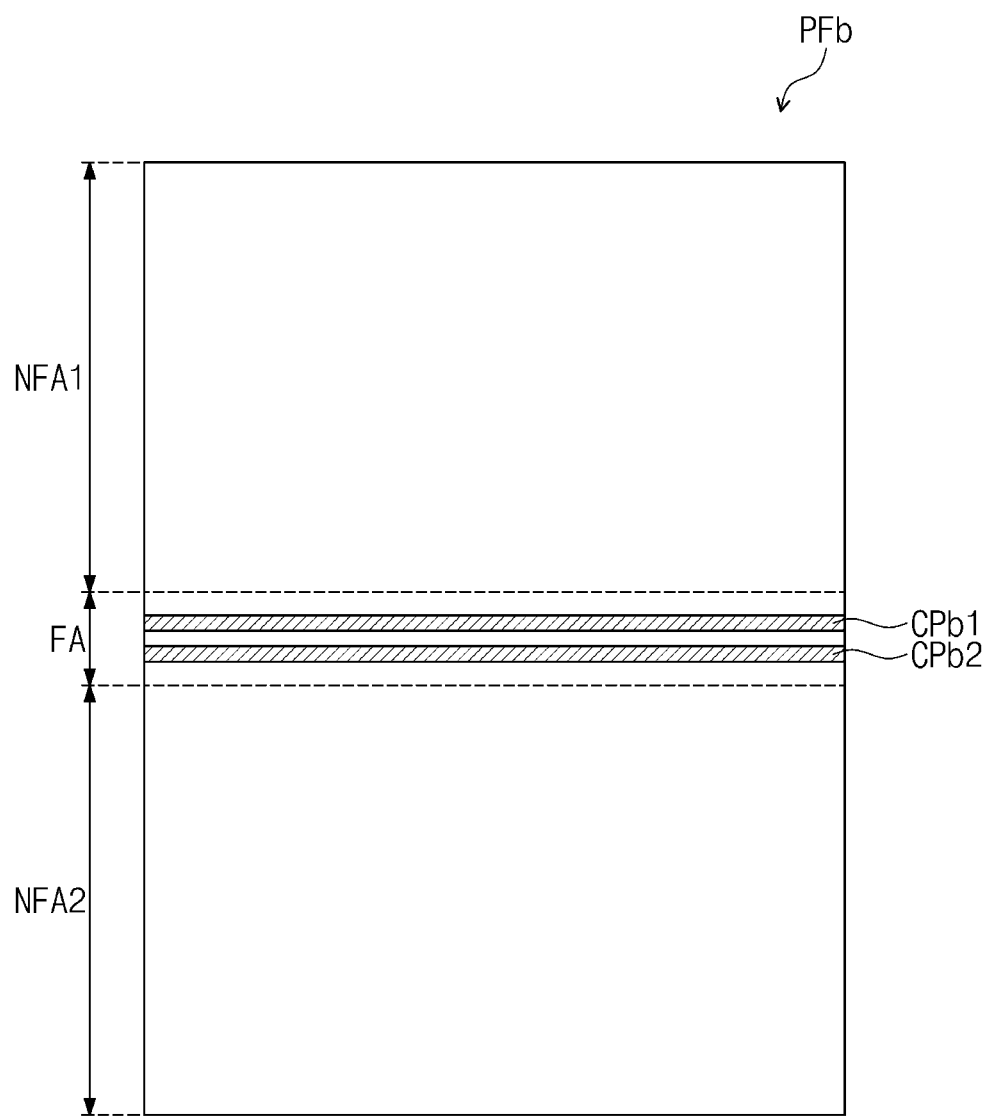

Referring to FIG. 7, a cutout portion may be provided as a plurality of cutout portions CPb1 and CPb2 in a protective film PFb and the adhesive layer AL (see FIG. 3). The plurality of cutout portions CPb1 and CPb2 may overlap the folding region FA. The plurality of cutout portions CPb1 and CPb2 may extend in the second direction DR2 and may be formed to be spaced apart from each other in the first direction DR1. The plurality of cutout portions CPb1 and CPb2 may include a first cutout portion CPb1 and a second cutout portion CPb2.

Since the first and second cutout portions CPb1 and CPb2 are formed in the folding region FA, the tensile force generated when the display device DD (see FIG. 1) is folded may be significantly reduced compared to when one cutout portion CPa (see FIG. 6) is formed. Since the tensile force is reduced, damage to the display device DD caused by folding and unfolding operations may be reduced or prevented.

Figure 8:
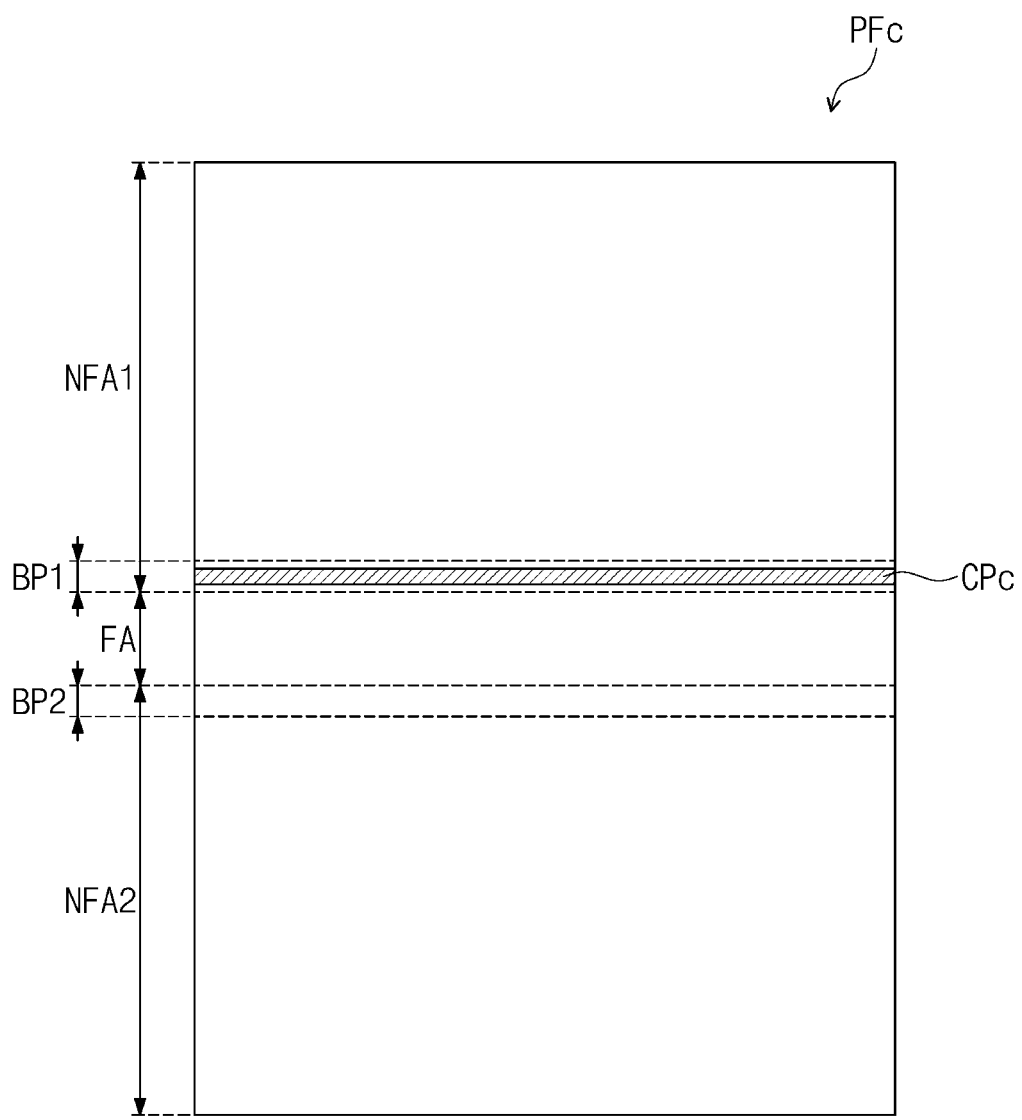

Referring to FIG. 8, a cutout portion CPc may be formed to overlap either of the first boundary portion BP1 or the second boundary portion BP2. FIG. 8 illustrates an example in which the cutout portion CPc is formed to overlap the first boundary portion BP1, but the cutout portion CPc may be formed to overlap the second boundary portion BP2. The cutout portion CPc may extend in the second direction DR2.

Figure 9:
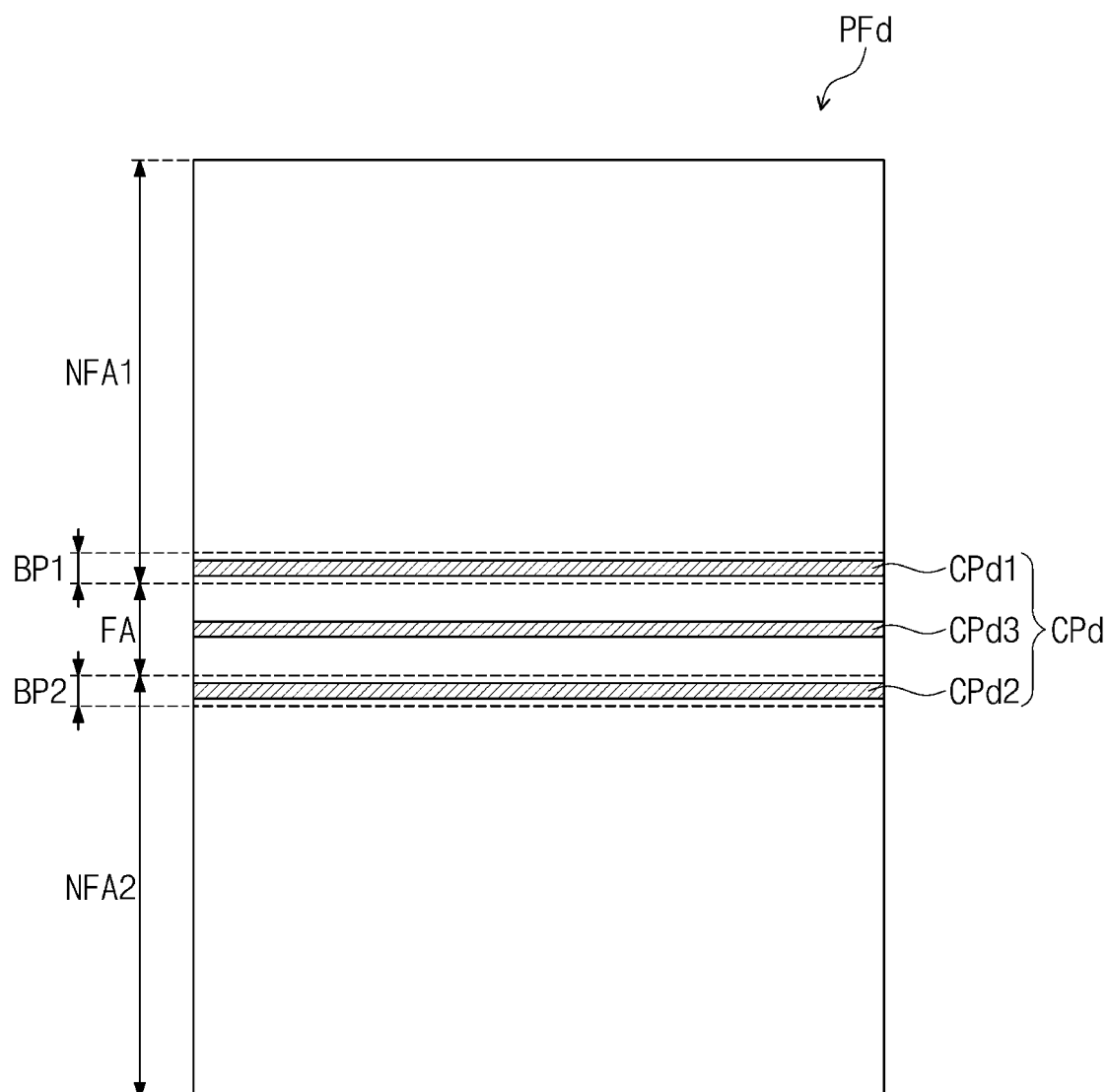

Referring to FIG. 9, a cutout portion may be provided as a plurality of cutout portions CPd in a protective film PFd and the adhesive layer AL (see FIG. 3). The cutout portions CPd may extend in the second direction DR2 and may be formed to be spaced apart from each other in the first direction DR1. The plurality of cutout portions CPd may include a first cutout portion CPd1, a second cutout portion CPd2, and a third cutout portion CPd3. The first cutout portion CPd1 may overlap the first boundary portion BP1, and the second cutout portion CPd2 may overlap the second boundary portion BP2. That is, the first cutout portion CPd1 may be formed in the first non-folding region NFA1 adjacent to the folding region FA, the second cutout portion CPd2 may be formed in the second non-folding region NFA2 adjacent to the folding region FA, and the third cutout portion CPd3 may be formed in the folding region FA.

Since the first cutout portion CPd1, the second cutout portion CPd2, and the third cutout portion CPd3 are formed, a tensile force generation region where tensile force is generated during folding of the display device DD may be limited to the folding region FA, and tensile force may not be generated in the first non-folding region NFA1 and the second non-folding region NFA2. Since the tensile force generation region is reduced, a maximum amount of deformation due to the tensile force may be reduced, and a folding stress applied to the first non-folding region NFA1 and the second non-folding region NFA2 may be removed or reduced. Also, an edge portion, such as a bending portion (not shown) of a chip on plastic (COP) of the display device DD, may not be affected by a folding operation. Accordingly, damage to the display device DD according to folding and unfolding operations may be reduced or prevented.

Figure 10:
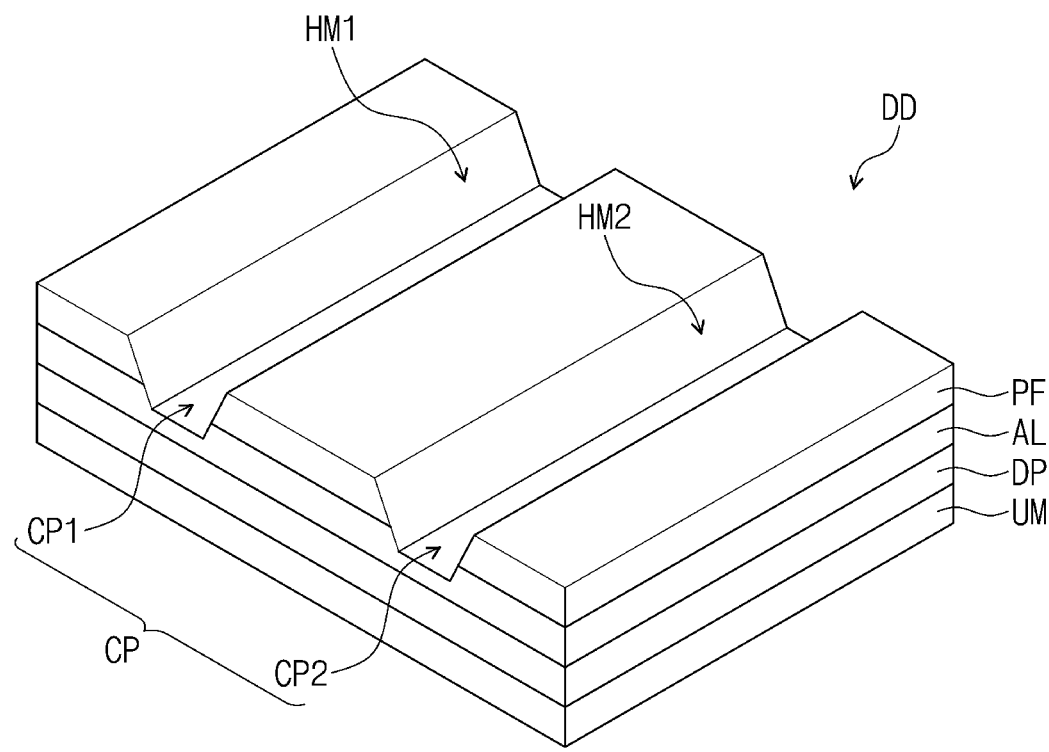
FIG. 10 is a perspective view of a display device according to an embodiment of the inventive concept.

FIG. 10 is a perspective view of a display device DD according to an embodiment of the inventive concept.

Referring to FIG. 10, the plurality of cutout portions CP formed in the display device DD may respectively include grooves HM1 and HM2 extending along the second direction DR2. For example, a first groove HM1 extending along the second direction DR2 may be defined in the first cutout portion CP1, and a second groove HM2 extending along the second direction DR2 may be defined in the second cutout portion CP2. Each of the grooves HM1 and HM2 may have a linear shape having a length corresponding to a width in the second direction DR2 of the protective film PF (see FIG. 5).

FIGS. 11A to 11D are enlarged views illustrating a portion corresponding to a region AA' of FIG. 5 according to some embodiments of the inventive concept. Although FIGS. 11A to 11D illustrate some examples of holes GV, GV-1, GV-2, GV-3, and GV-4 of the first cutout portion CP1 of FIG. 5, the holes GV, GV-1, GV-2, GV-3, and GV-4 may also be applied to the second cutout portion CP2 (see FIG. 5) of the second non-folding region NFA2 (see FIG. 5) or the cutout portion CPa of the folding region FA (see FIG. 6).

Figure 11A:
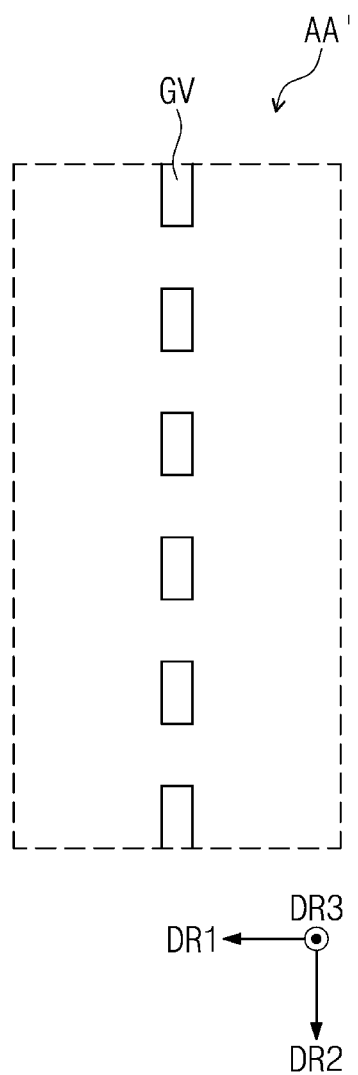
FIGS. 11A to 11D are enlarged views illustrating a portion corresponding to a region AA' of FIG. 5 according to some embodiments of the inventive concept.

Referring to FIGS. 5 and 11A, the first cutout portion CP1 may include a plurality of holes GV. The plurality of holes GV may be arranged to be spaced apart from each other in a direction parallel to the second direction DR2. In an embodiment, each of the plurality of holes GV may have a quadrangular shape having a long side parallel to the second direction DR2 when viewed in a plan view.

Figure 11B:
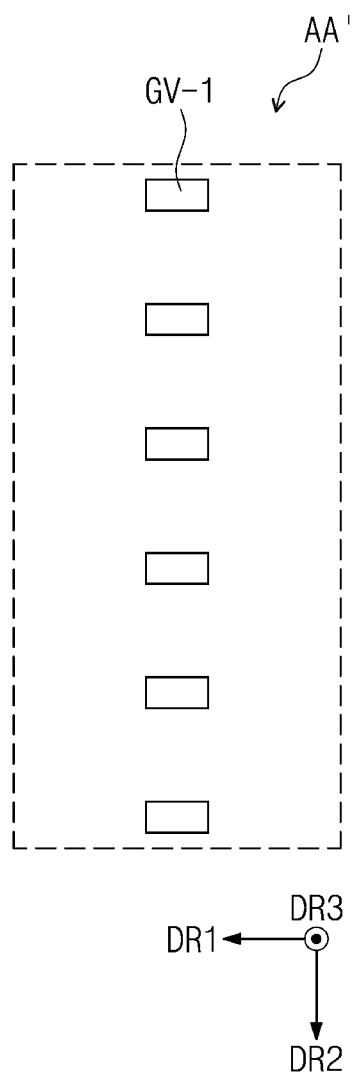

Referring to FIGS. 5 and 11B, the first cutout portion CP1 may include a plurality of first holes GV-1. The plurality of first holes GV-1 may be arranged to be spaced apart from each other in a direction parallel to the second direction DR2. In an embodiment, each of the plurality of first holes GV-1 may have a quadrangular shape having a long side parallel to the first direction DR1 when viewed in a plan view.

Figure 11C:
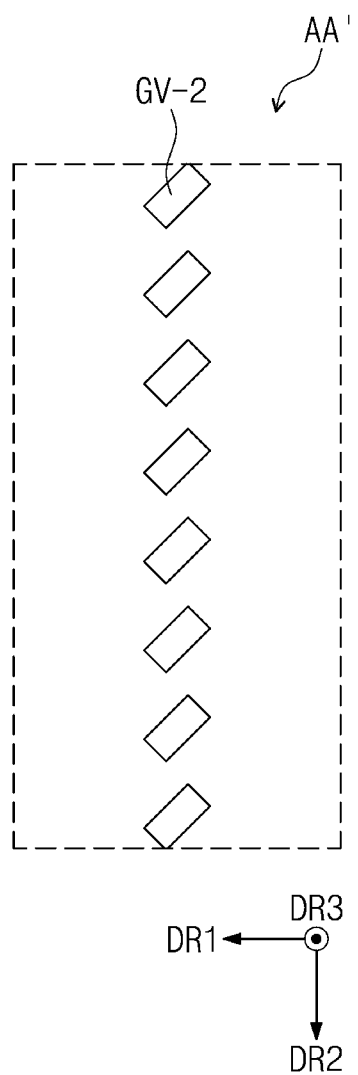

Referring to FIGS. 5 and 11C, the first cutout portion CP1 may include a plurality of second holes GV-2. The plurality of second holes GV-2 may be arranged to be spaced apart from each other in a direction parallel to the second direction DR2. In an embodiment, each of the plurality of second holes GV-2 may have a quadrangular shape having a long side parallel to a direction between the first direction DR1 and the second direction DR2 when viewed in a plan view.

Figure 11D:
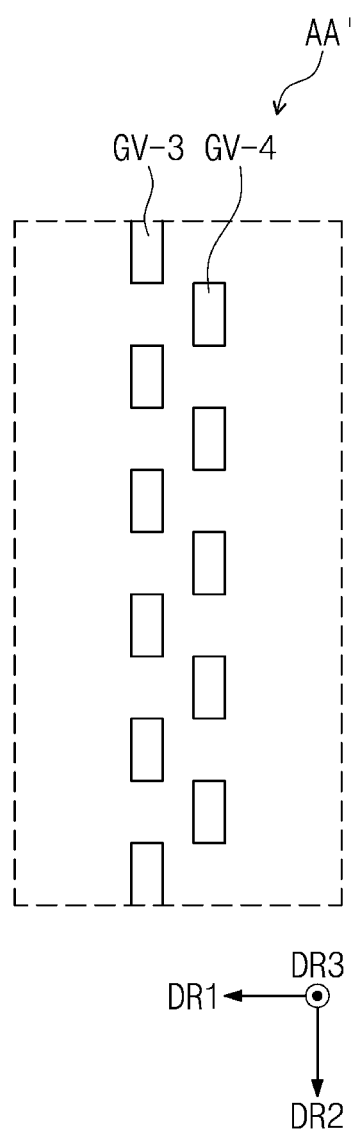

Referring to FIGS. 5 and 11D, the first cutout portion CP1 may include a plurality of holes GV-3 and GV-4. The plurality of holes GV-3 and GV-4 may include a plurality of third holes GV-3 and a plurality of fourth holes GV-4. Each of the plurality of third holes GV-3 and the plurality of fourth holes GV-4 may be arranged to be spaced apart from each other in a direction parallel to the second direction DR2. The plurality of third holes GV-3 and the plurality of fourth holes GV-4 may be arranged to be spaced apart from each other in the first direction DR1, and may be alternately arranged in a direction parallel to the second direction DR2. In an embodiment, the plurality of third holes GV-3 and the plurality of fourth holes GV-4 may each have a long side parallel to the second direction DR2 when viewed in a plan view. However, the shapes of the plurality of third holes GV-3 and the shapes of the plurality of fourth holes GV-4 are not limited thereto. For example, when viewed in a plan view, the plurality of third holes GV-3 and the plurality of fourth holes GV-4 may each have a long side parallel to the first direction DR1 like the plurality of first holes GV-1 of FIG. 11B or may have a long side parallel to a direction between the first direction DR1 and the second direction DR2 like the plurality of second holes GV-2 of FIG. 11C.

As described above, a cutout portion may be provided in a protective film disposed below the display panel. The cutout portion may be provided at a boundary between a folding region and a non-folding region or provided at the folding region. Accordingly, a tensile force generated when the display device is folded may be reduced. For example, a tensile force generation region where tensile force is generated during folding of the display device may be limited to the folding region, and, thus, the tensile force may not be generated in the first non-folding region and the second non-folding region. Since the area of the tensile force generation region is reduced, a maximum amount of deformation due to tension may be reduced, and a folding stress applied to the first non-folding region and the second non-folding region may be prevented or reduced. Accordingly, damage to the display device caused by folding and unfolding operations of the display device may be reduced or prevented.

In addition, by forming the maximum width of the cutout portion to be about micrometers or less, it is possible to prevent or substantially prevent the cutout portion from being viewed from the outside of the display device. Since the cutout portion defined in the adhesive layer has a depth of less than half of the thickness of the adhesive layer, damage to the display panel may be reduced or prevented, and product reliability of the display panel may be improved.

Although some embodiments of the present invention have been described, it is to be understood that the present invention should not be limited to these embodiments, but various changes and modifications can be made by one of ordinary skill in the art within the spirit and scope of the present invention as claimed herein.

What is claimed is:

1. A display device comprising:
   a display panel comprising a first non-folding region, a folding region, and a second non-folding region;
   a protective film below the display panel, and overlapping at least a portion of the first non-folding region, at least a portion of the folding region, and at least a portion of the second non-folding region; and
   an adhesive layer between the display panel and the protective film,
   wherein a cutout portion is defined to pass through the protective film and a portion of the adhesive layer in a thickness direction,
   wherein the cutout portion defined in the portion of the adhesive layer has a depth of less than half of a thickness of the adhesive layer.

2. The display device of claim 1, wherein the cutout portion overlaps with the folding region.

3. The display device of claim 1, wherein the first non-folding region, the folding region, and the second non-folding region are arranged along a first direction,
the cutout portion is provided as a plurality of cutout portions, the plurality of cutout portions are spaced apart from each other in the first direction, and each of the plurality of cutout portions extends along a second direction crossing the first direction.

4. The display device of claim 3, wherein the plurality of cutout portions overlaps with the folding region.

5. The display device of claim 3, wherein the display panel comprises a first boundary portion of the first non-folding region adjacent to the folding region and a second boundary portion of the second non-folding region adjacent to the folding region, and
the plurality of cutout portions comprises a first cutout portion overlapping with the first boundary portion and a second cutout portion overlapping with the second boundary portion.

6. The display device of claim 3, wherein a first cutout portion of the plurality of cutout portions overlaps with the first non-folding region, a second cutout portion of the plurality of cutout portions overlaps with the second non-folding region, and a third cutout portion of the plurality of cutout portions overlaps with the folding region.

7. The display device of claim 1, wherein the display panel comprises a first boundary portion of the first non-folding region adjacent to the folding region and a second boundary portion of the second non-folding region adjacent to the folding region, and the cutout portion is defined to overlap with one of the first boundary portion or the second boundary portion.

8. The display device of claim 1, wherein the first non-folding region, the folding region, and the second non-folding region are arranged along a first direction, and
the cutout portion comprises a groove extending along a second direction crossing the first direction.

9. The display device of claim 1, wherein the first non-folding region, the folding region, and the second non-folding region are arranged along a first direction, and
the cutout portion comprises a plurality of holes arranged to be spaced apart along a second direction crossing the first direction.

10. The display device of claim 9, wherein each of the plurality of holes has a quadrangular shape having a long side parallel to the first direction when viewed in a plan view.

11. The display device of claim 9, wherein each of the plurality of holes has a quadrangular shape having a long side parallel to the second direction when viewed in a plan view.

12. The display device of claim 9, wherein each of the plurality of holes has a quadrangular shape having a long side parallel to a direction between the first direction and the second direction when viewed in a plan view.

13. The display device of claim 1, wherein a width of the cutout portion defined in the protective film becomes greater as farther away from a boundary between the protective film and the adhesive layer.

14. The display device of claim 1, wherein a width of the cutout portion defined in the adhesive layer becomes smaller as farther away from a boundary between the protective film and the adhesive layer.

15. The display device of claim 1, wherein the cutout portion has a width of about 30 micrometers or less.

16. The display device of claim 1, wherein when the display device is folded, a tensile force applied to the protective film overlapping with the first non-folding region and the second non-folding region is less than a tensile force applied to the protective film overlapping with the folding region.

17. The display device of claim 1, wherein, when the display device is viewed in a cross-sectional direction, the cutout portion has a trapezoidal shape.

18. An electronic device comprising:
a display panel comprising a first non-folding region, a folding region, and a second non-folding region which are arranged along a first direction;
a protective film below the display panel, configured to protect one surface of the display panel, and comprising a first protective film overlapping with the first non-folding region, a second protective film overlapping with the folding region, and a third protective film overlapping with the second non-folding region; and
an adhesive layer between the display panel and the protective film, configured to adhere the protective film to the display panel,
wherein the first protective film, the second protective film, and the third protective film are spaced apart from each other in the first direction, and
wherein cutout portions passing through at least a portion of the adhesive layer in a thickness direction are respectively defined between the first protective film and the second protective film and between the second protective film and the third protective film, and each of the cutout portions has a width of about 30 micrometers or less.

19. The electronic device of claim 18, wherein the cutout portions defined in the adhesive layer have a depth of less than half of a thickness of the adhesive layer.

* * * * *